(12) United States Patent
Fairchild

(10) Patent No.: US 6,466,399 B1
(45) Date of Patent: Oct. 15, 2002

(54) CARTRIDGE LATCH AND RELEASE SYSTEM

(75) Inventor: Scot C. Fairchild, Santa Clara, CA (US)

(73) Assignee: Terastor Corporation, Milpitas, CA (US)

( * ) Notice: Subject to any disclaimer, the term of this patent is extended or adjusted under 35 U.S.C. 154(b) by 0 days.

(21) Appl. No.: 09/441,154

(22) Filed: Nov. 12, 1999

(51) Int. Cl.$^7$ ............................................... G11B 17/04
(52) U.S. Cl. ............................................... 360/99.06
(58) Field of Search ........................ 360/99.06, 99.02, 360/96.05; 369/75.1–75.2, 77.1–77.2

(56) References Cited

U.S. PATENT DOCUMENTS

| | | | | |
|---|---|---|---|---|
| 5,577,014 A | * | 11/1996 | Kawamura | ............... 360/99.06 |
| 5,684,655 A | * | 11/1997 | Fujimura | ................. 360/99.06 |
| 5,703,857 A | * | 12/1997 | Davis et al. | ............. 360/99.06 |
| 5,796,698 A | * | 8/1998 | Ookawa et al. | .......... 360/99.06 |
| 5,815,344 A | * | 9/1998 | Aoki | ....................... 360/99.06 |
| 5,963,534 A | * | 10/1999 | Tanaka et al. | ........... 360/99.06 |
| 6,072,658 A | * | 6/2000 | Kumagai | ................... 360/96.5 |

\* cited by examiner

*Primary Examiner*—Allen Cao
(74) *Attorney, Agent, or Firm*—Fish & Richardson P.C.

(57) ABSTRACT

A system secures a cartridge inserted into a data storage device. The system includes a slidable member with a recess positioned therein; a toggle pivotably mounted in the recess, the toggle having a tip to pivot the toggle upon contacting the cartridge; and an interlock unit coupled to the slidable member and adapted to engage the toggle when the toggle pivots.

25 Claims, 8 Drawing Sheets

CARTRIDGE LATCH AND RELEASE SYSTEM

The present invention relates to a cartridge latch and release system in a removable data storage device.

The rapid growth of digital content and the convergence of information and communications technologies are driving the growth of affordable, high-capacity data storage solutions. For example, modern multimedia applications such as video editing and immersive imaging can generate files that are each multi-gigabytes in size. Numerous data storage solutions, each differing in architecture, capacity, performance, reliability, and cost, have evolved to quench users' thirst for economical and high capacity data storage systems.

Generally, data storage devices can be stand-alone units that are connected to a computer system by cable, or they can be is internal units that occupy a slot, or bay, in the computer system. Since applications such as video editing and immersive imaging can generate files that are each multi-gigabytes in size, disk drives of the type that accept removable disks have become increasingly popular. These disk drives are also convenient since users can incrementally add storage capacity as needed and use the removable disks as back-up copies.

For purposes of convenience and protection, the platter or disk may be mounted within a shuttle, which in turn is positioned inside an enclosure or a cartridge. During operation, the cartridge is inserted into an insertion port of the drive. The shuttle is moved inside the drive, and the platter or disk is then conveyed to a predetermined position. At this point, the empty cartridge can be removed. When the user is finished with the platter or disk, the cartridge is inserted into the port, causing the platter or disk to be moved back into the shuttle, which in turn is retracted back inside the cartridge. Once the shuttle is secured inside the cartridge, the cartridge can then be removed from the insertion port by the user.

Because the cartridge needs to be removed after the shuttle has been pulled into the drive before data can be accessed, it is possible for a new user of the removable data storage device to be confused by the required sequence of inserting the cartridge into the drive, withdrawing the cartridge when the shuttle has been moved into the drive, and inserting the empty cartridge into the drive once more to retrieve the shuttle/disk when the user is finished with an application.

Additionally, during operation, the position of the shuttle may vary. Due to a number of considerations, it is possible that, without some form of protection, the shuttle may be caught in an undesirable position between the drive and the shuttle, possibly causing damage to the media and components in the drive during media insertion.

Further, the cartridge needs to be correctly inserted into the drive. Otherwise, an incorrectly seated cartridge may wobble and may vibrate during operation. Such wobbling and vibration adversely affects the performance of the drive. Moreover, a cartridge may also be unintentionally inserted into the drive somewhat askew from a nominal position. This skewed position may cause a mechanical misalignment of the drive, leading to disk access failures. Additionally, cartridges not specifically intended for use in the drive can initiate certain critical functions of the drive upon insertion into the drive, causing damage.

SUMMARY

In one aspect, the invention provides a system for securing a cartridge inserted into a data storage device. The system includes a slidable member, the member having a recess positioned therein. The system also includes a toggle pivotably mounted in the recess, the toggle having a tip to pivot the toggle upon contacting the cartridge. An interlock unit is connected to the slidable member and adapted to engage the toggle when the toggle pivots.

In another aspect, the system provides a method for securing a cartridge inserted into a data storage device. The method includes receiving a cartridge having a tab with an edge portion adapted to move a cartridge latch during a first phase; and a notch adapted to engage the cartridge latch to lock the cartridge with the data storage device; sliding a slidable member during the first phase; pivoting a toggle rotatably mounted in the slidable member; and engaging the toggle with an interlock unit coupled to the slidable member.

In yet another aspect, a cartridge is shown. The cartridge is adapted to be inserted into a data storage device, the data storage device having a cartridge latch for securing the cartridge to the data storage device. The cartridge has a bottom casing, the bottom casing having a front portion; and a tab formed on the front portion of the bottom casing. The tab has an edge portion adapted to move a cartridge latch during a first phase; and a notch adapted to engage the cartridge latch to lock the cartridge with the data storage device.

Advantages of the invention include one or more of the following. The invention provides a simple, low-cost and reliable system for latching and releasing the cartridge. The shuttle cartridge is latched only when the drive opens the drive door and released only when the shuttle is pulled into the drive or pushed from the drive to the cartridge. The invention releases the cartridge only when the shuttle motion is complete, thus preventing damage to the media caused by inappropriate insertions or ejections. Thus, shuttle jamming is avoided.

The invention advantageously provides a natural logical user interface for both personal and library applications with the shuttle/cartridge combination. The interface requires that the cartridge be removed before the drive can continue operation.

Moreover, the invention is keyed to protect against an inadvertent insertion of an incompatible cartridge. Thus, the invention protects against damaging sensitive components internal to the drive if they collide with any foreign objects associated with the insertion of the incompatible disk cartridge.

Since the cartridge fits snugly with the drive housing, the cartridge assembly is mechanically secure, providing a reliable handling of the shuttle. Additionally, the invention protects the drive and the cartridge from foreign particle contamination.

The invention also provides a sensing system to notify the drive that a cartridge has been removed. This information is used to by a drive controller to disable data access and other operations such as unmounting the drive volume after the removal of the cartridge.

The aforementioned advantages are achieved without increasing the complexity of the drive, thereby increasing the performance and reliability of the entire system.

BRIEF DESCRIPTION OF THE DRAWINGS

The foregoing and other features, aspects and advantages of the invention will become better understood with regard to the following description, appended claims and accompanying drawings in which:

DETAILED DESCRIPTION

Figure 1:
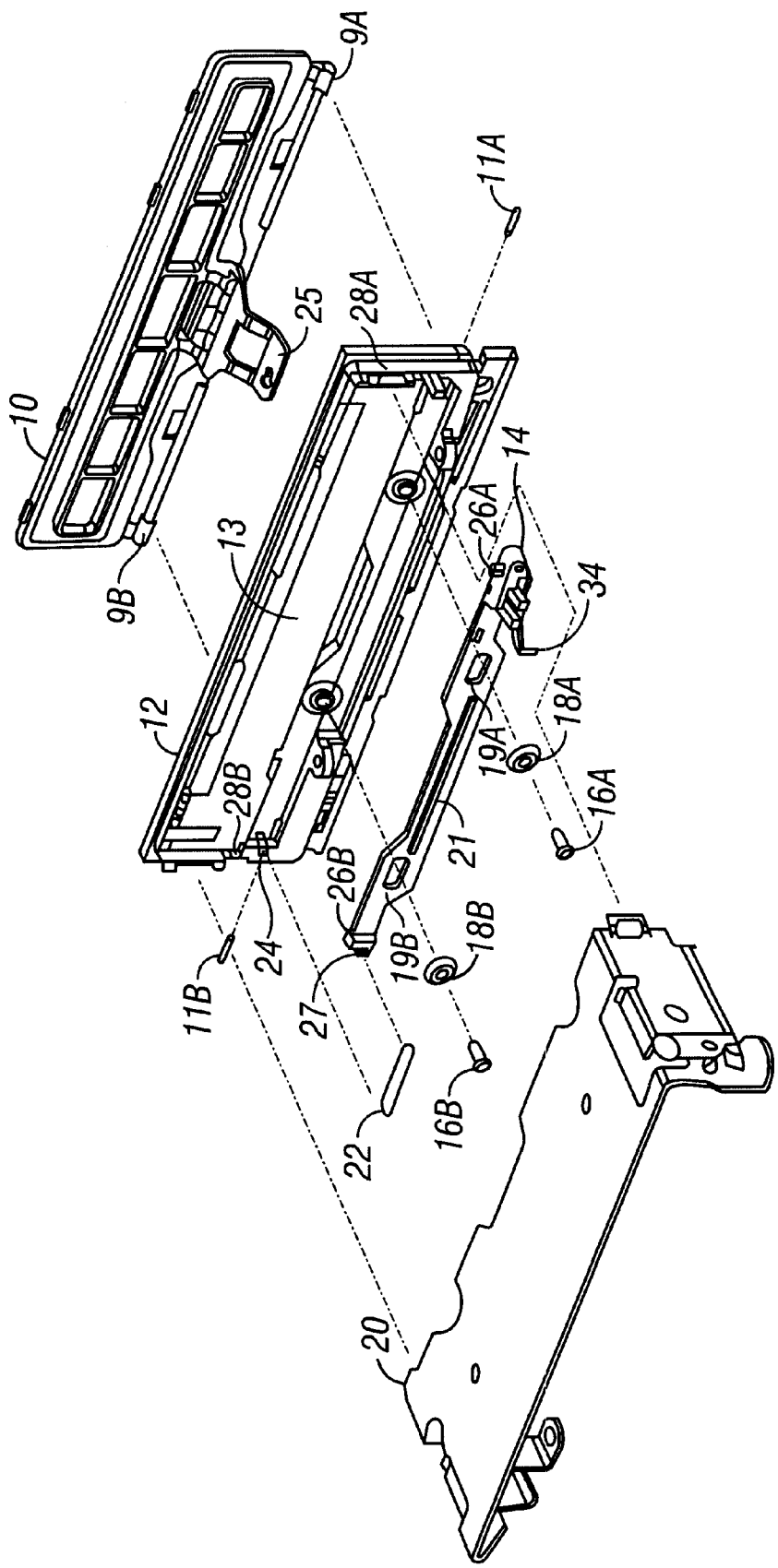
FIG. 1 is an exploded view of a door assembly in conjunction with a latch in accordance with the invention.

FIG. 1 shows a door assembly that allows a cartridge to latch under predetermined timing conditions. A door frame 12 provides structural support for receiving a cartridge. The outer door 10 has hinges 9A and 9B positioned at the base of the outer door 10. The hinges 9A and 9B are adapted to receive pins 11A and 11B, which secure the outer door 10 to the frame 12. In this manner, the outer door 10 can rotate from a substantially closed position wherein the outer door 10 is substantially parallel to the door frame 12, thereby forming a sealed compartment to protect the media inside of the compartment, to a substantially open position wherein the outer door 10 becomes substantially an extension of the base of the drive to expose a port through which a cartridge can be inserted or removed. In general, a user cannot manually open the outer door 10. Rather, the drive actuates a door handle 25, which causes the outer door 10 to move from the substantially closed position to the open position.

The frame 12 also contains an inner door 13 that is normally in a substantially closed position. When a cartridge is inserted, the inner door 13 flips to a substantially open position to allow the drive access to a shuttle in the cartridge. The inner door 13 swings upward when the cartridge is inserted.

A lock slide or latch 14 is secured to the frame 12 using screws 16A and 16B and retainers 18A and 18B through latch openings 19A and 19B. The screws 16A and 16B hold the latch 14 to the frame 12, but still allow the latch 14 to move horizontally within a predetermined tolerance.

The latch 14 has guides 26A and 26B mounted thereon. The guides 26A and 26B allow the latch 14 to be moved from a closed position to an open position when a cartridge is inserted into the drive, as discussed in more detail below. A spring 22 connects a hook 27 located at one end of the latch 14 to a hook 24 mounted on the door frame 12. The spring 22 resiliently provides an appropriate tensioning force on the latch 14 to move the latch 14 from its open position to its closed position.

A sensor flag 34 is provided at the front of the other end of the latch 14, on the front of the latch. When actuated, the sensor flag 34 indicates cartridge insertion, as discussed in more detail below. The latch 14 also has a support rail 21 running longitudinally along the back of the latch 14. The support rail 21 stiffens and strengthens the latch 14.

A receiver bezel 20 snaps in to the door frame 12 to complete the front assembly of the drive of FIG. 1. The snapping of receiver bezel 20 is via recesses 28A and 28B. Once installed, the receiver bezel 20 protects mechanical and electrical components of the drive from interference and/or damage caused by external objects.

Figure 2A:
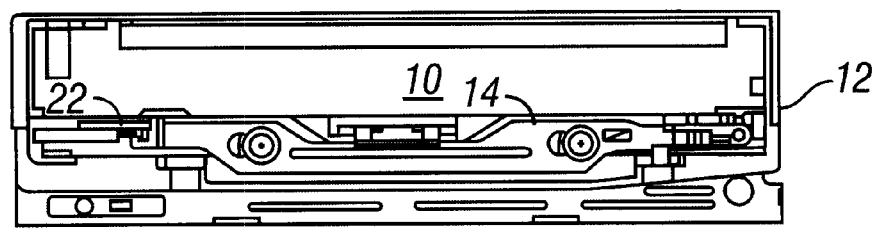
FIGS. 2A, 2B, and 2C are perspective front, top and side views of the door assembly of FIG. 1, respectively.
Figure 2B:
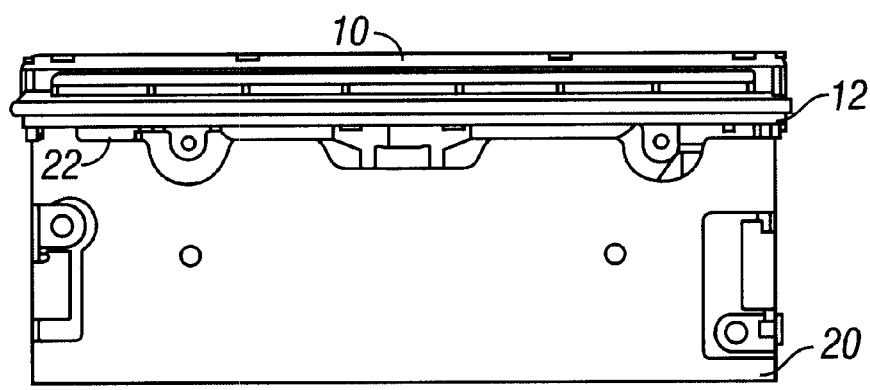
Figure 2C:
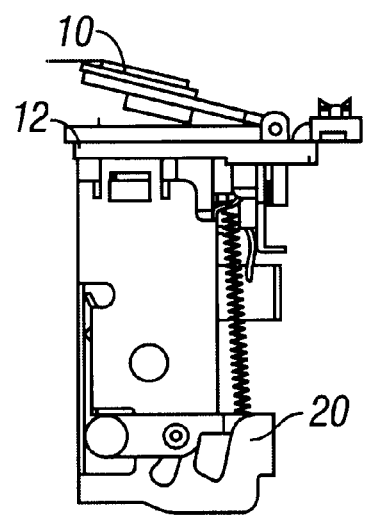

The completed assembly of FIG. 1 is shown in FIGS. 2A–2C, which correspond to front, top and side views of the door assembly, respectively.

Figure 3A:
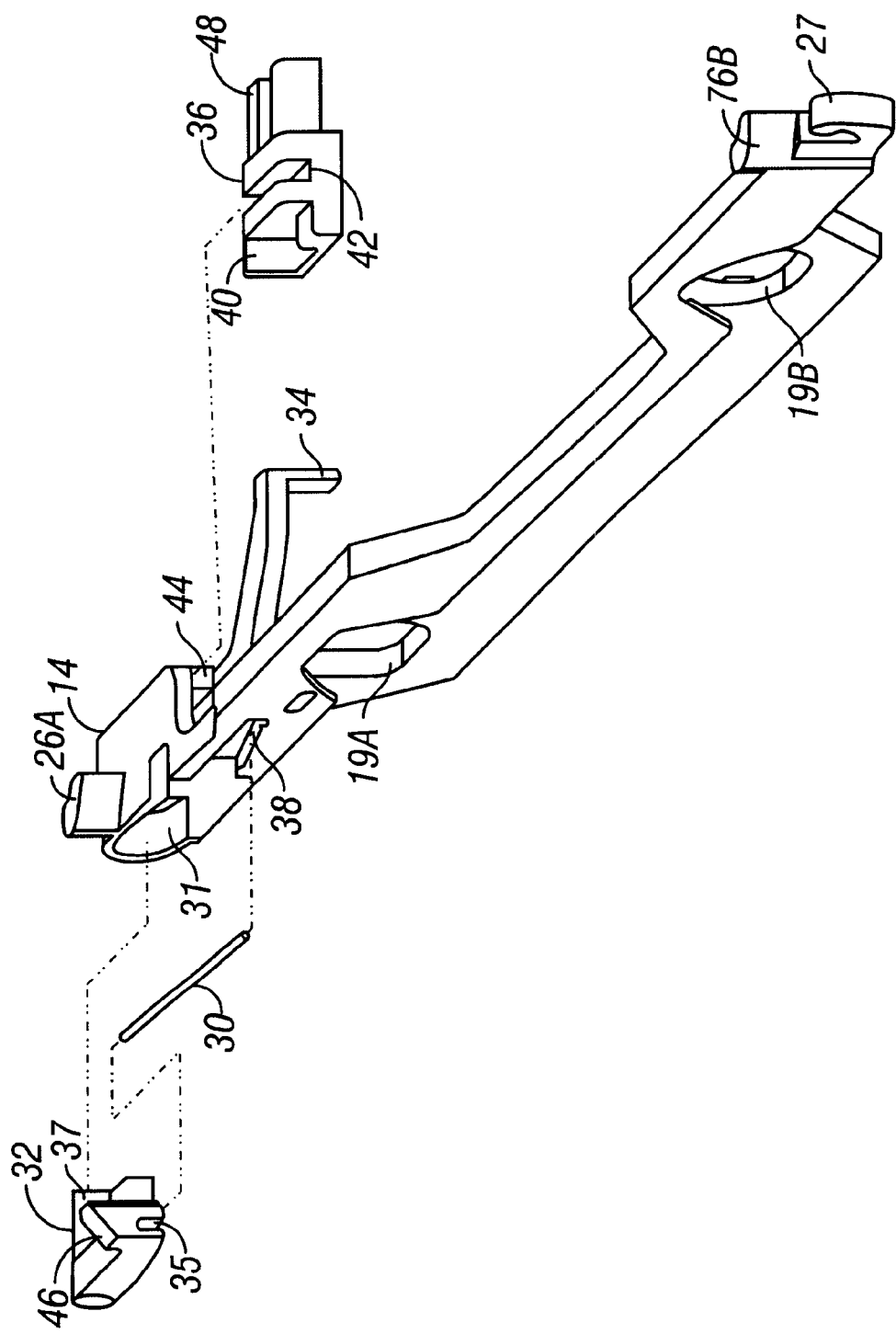
FIGS. 3A, 3B, and 3C are perspective, side and top views of a latch of FIG. 1, respectively.

FIG. 3A shows in more detail the sensor flag 34 and its relationship to the latch 14. As shown therein, a toggle 32 is hingeably secured to a recess 31 of the latch 14. The recess 31 has a groove that receives one end of a spring 30. The other end of the spring 30 is received by an opening 35 at the base of the toggle 32. The spring 30 rotatably secures the toggle 32 to the recess 31 of the latch 14.

Figure 3B:
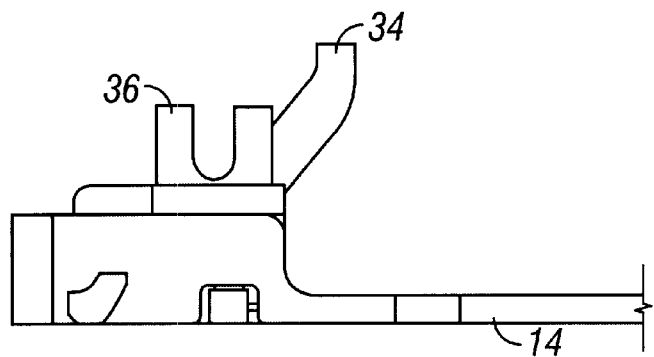
Figure 3C:
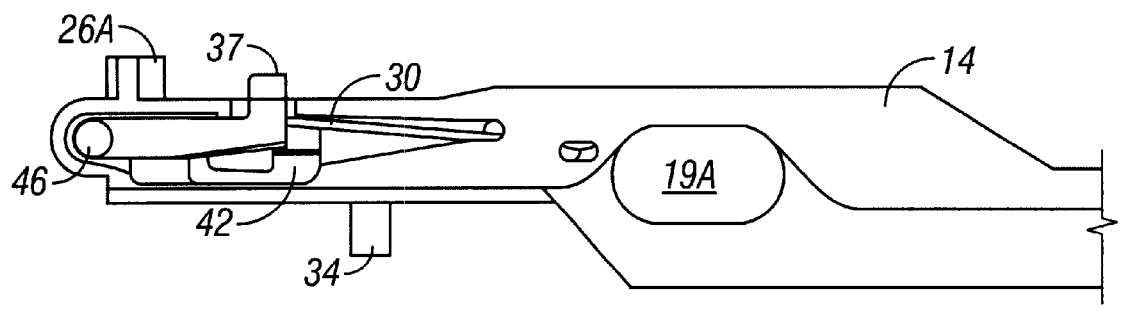

The toggle 32 has a generally cylindrical post 37 that engages a corresponding recess 31. The latch 14 is also connected to an interlock unit 36 having a vertical slit 42 that receives a projection 44 residing on the latch 14. The toggle 32 also has a vertical slanted tip 46 whose profile catches a tab or finger 130 on the bottom of a cartridge 99 (FIGS. 4 and 5) when the cartridge 99 is fully inserted into the drive. The profile of the tip 46 allows the tip 46 to be gradually deflected as the cartridge is inserted into the drive. FIGS. 3B and 3C show top and side views of the latch 14 after the interlock unit 36 and the toggle 32 have been assembled into the latch 14.

Sensor flag 34, also mounted on the latch 14, moves to interrupt a beam of light shining through a light sensor assembly. The interruption of light through the sensor assembly provides a signal that indicates that a cartridge has been inserted/removed. This signal is sent to a controller in the drive for appropriate handling.

Figure 4:
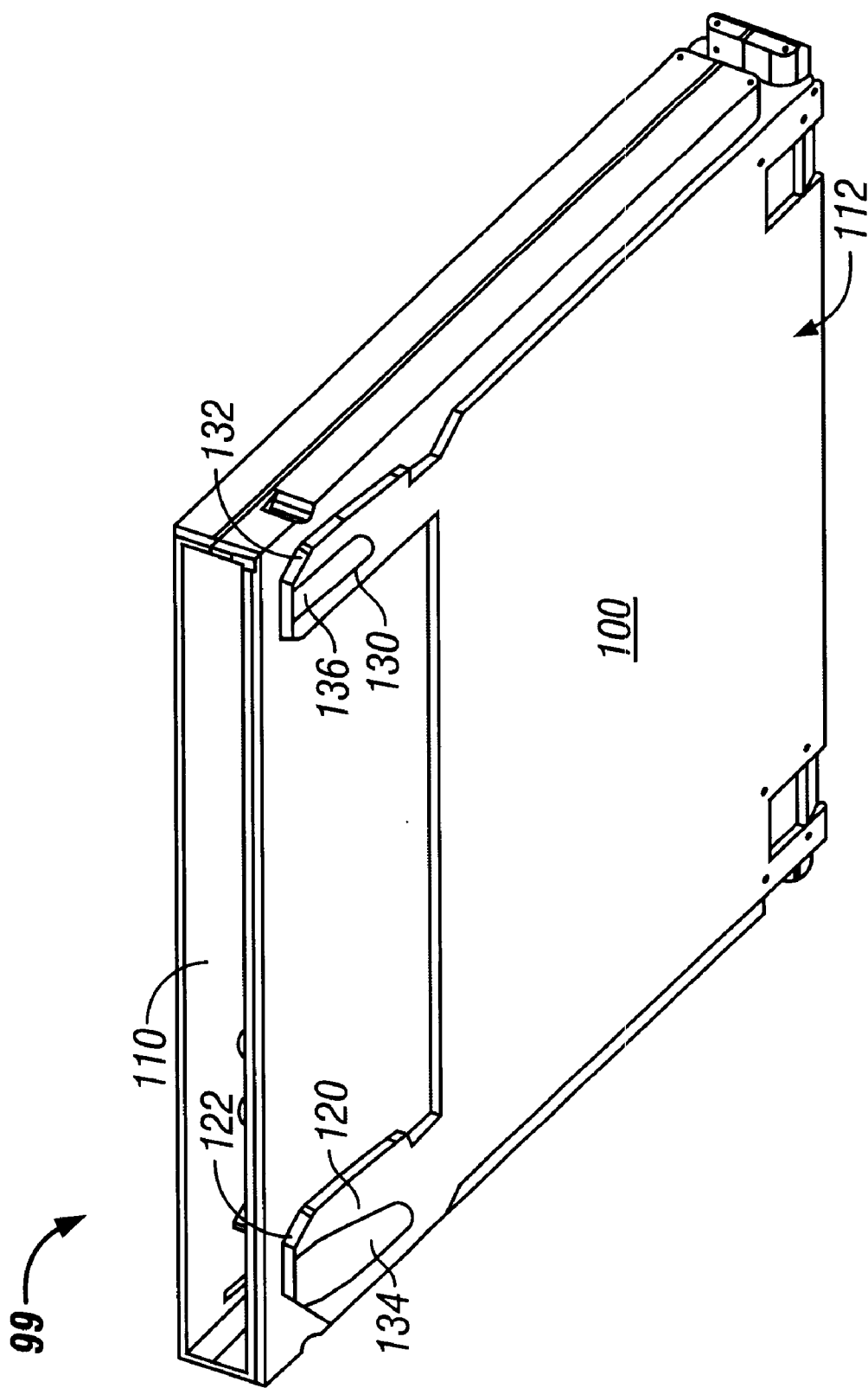
FIG. 4 is a bottom perspective view of a cartridge that is to be inserted into the door assembly of FIG. 1.

FIG. 4 shows a bottom side perspective view of a cartridge 99. The cartridge 99 has an outer shell or casing 100. An opening 110, through which a shuttle (not shown) containing a platter or disk can be retrieved, is defined by the casing 100.

Opposite to the opening 110 is a user handling area 112 which can be used by the user to insert and extract the cartridge 99 in and out of the drive.

The top of the cartridge 99 is generally rectangular in shape with a few surface features on an outer cartridge shell, such as notches, grooves of the like. Bevel tabs or fingers 120 and 130 are positioned on the bottom outer periphery of the outer shell or casing 100. These bevel tabs 120–130 are configured such that when the cartridge 99 is inserted into the drive, only the outer most periphery of the drive contacts the bevel tabs 120–130.

The tabs 120 and 130 have multi-faceted tips. In particular, the tabs 120 and 130 have angled edges 122 and 132, respectively. The tab 130 also has a groove 136. During insertion, the latch 14 is initially at a closed position where it is separated from the interlock unit 36. As the cartridge is inserted into the drive, the angled edges 122 and 132 are urged against the guides 26A and 26B of the latch 14 to move the latch from the closed position to the open position. When the tip 46 is depressed, it connects the latch 14 to the interlock unit 36. Both then move together so that a loader 170 (FIG. 5) can drive the latch 14 to the open position and release the cartridge 99.

The tab 120 can be made wider than the. tab 130 to provide further orientation of the cartridge 99. Only the correct cartridge orientation is allowed when the user inserts the cartridge 99 in the drive. After the cartridge 99 has been correctly oriented and inserted by the user, the cartridge 99 is locked into place by the latch 14.

Figure 5:
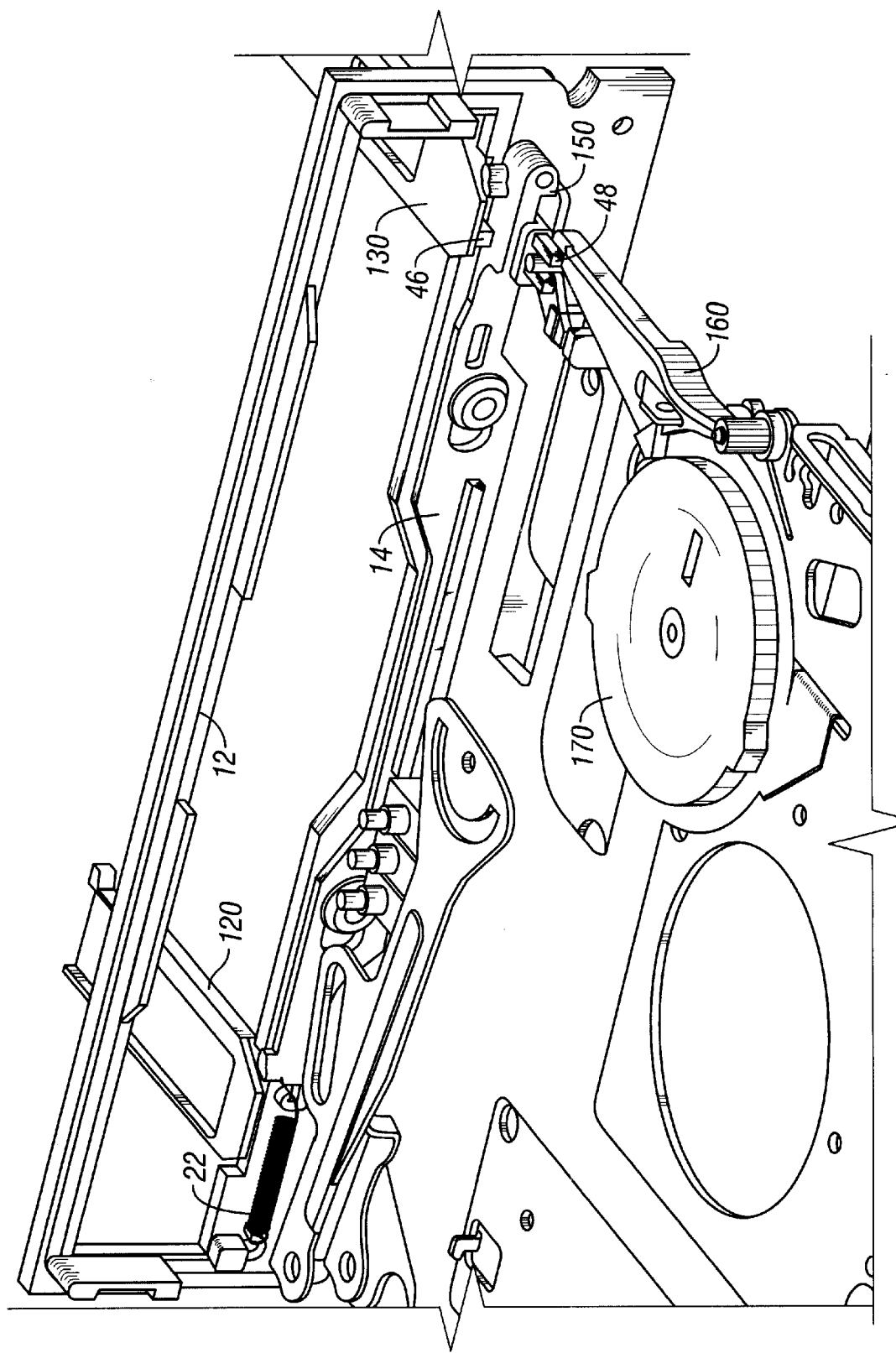
FIG. 5 is a perspective view of the door assembly and the latch of FIG. 1.
Figure 6:
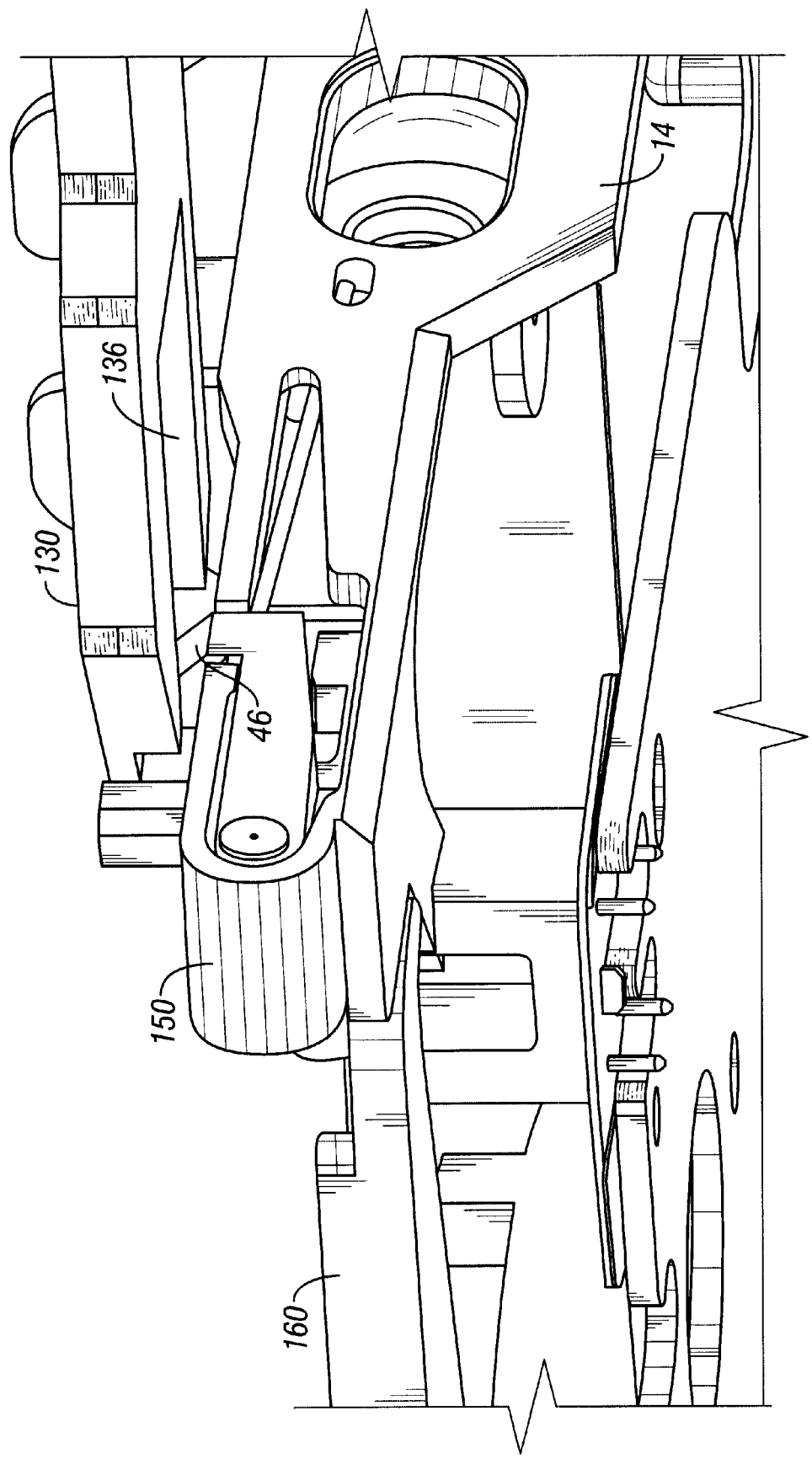
FIG. 6 is a second perspective view illustrating an interaction between the latch of FIG. 5 and a cartridge tab.

FIGS. 5–6 show the cooperative relationship between the fingers 120–130 of the cartridge 100 and the latch 14 in more detail. The double-pronged tip 48 is connected to a lever 160, which drives a loader cam gear 170. When the latch 14 is at the rest position, a cartridge such as the cartridge 99 can be accepted.

The loader cam gear 170 is motor driven. Upon request by the user, a loader motor controlled by a drive microprocessor opens the drive door by moving the door handle 25 (FIG. 1). When the drive door 10 is opened, the latch 14 is "primed." In other words, the loader cam gear 170 has positioned the interlock unit 48 in a position that allows the cartridge 99 to lock onto the drive when it is inserted. The interlock unit 48 is positioned through the release lever 160, which in turn is positioned by the cam gear 170. The cam gear 170 is driven by a loader motor and gear train.

As the cartridge 99 is inserted, the fingers or tabs 120–130 on the cartridge bottom contact the latch 14. This contact causes the latch 14 to slide sideways. The edges 122 and 132 on the bottom of the cartridge in turn smoothly move the latch 14. When the latch 14 has moved a maximum sideways distance so that it is on top of the tab plateau, the cartridge 99 contacts the tip 46 of the toggle 32, causing it to move downward. When the toggle 32 moves downwardly, it engages with the interlock unit 36 so that the two parts move together in a sideways direction. Since the toggle 32 is attached to the latch 14, all three parts must move together.

As the cartridge 99 is inserted further into the drive, the latch 14 moves off the plateau on the tabs 120–130 and finally drops into a perpendicular surface that locks the cartridge into the drive. While the cartridge 99 is locked securely in the drive, the loader moves a shuttle from the cartridge into the drive.

The release of the cartridge 99 occurs after the shuttle motion is completed. First, the cam gear 170 pushes the release lever 160 clockwise, this motion causes the interlock unit 36 to move to the left. Since the interlock unit 36, toggle 32, and latch 14 are locked together, they all move to the left. When the latch 14 moves to the left, the tips 26A–26B of the latch 14 are moved away from the perpendicular surfaces that releases the cartridge 99.

As the cartridge 99 is removed, the toggle 32 disconnects from the interlock unit 36. This disconnection allows the latch 14 to move independently of the interlock. As the cartridge 99 is moved further, the latch 14 moves off of the cartridge finger sideways to the right. When the latch 14 moves back to its starting position, the flag 34 on the latch 14 blocks an optocoupler sensor, as discussed earlier. The sensor provides an indicator that the cartridge 99 has been removed from the drive and the drive can continue to load the shuttle/disk into the drive.

In this manner, the system of FIGS. 5–6 latches the shuttle cartridge only when the drive opens the drive door and releases the shuttle only when it is pulled into the drive or pushed from the drive to the cartridge. Moreover, the cartridge is released only when the shuttle motion is complete, thus preventing shuttle jamming or damaging the media through inappropriate insertions or ejections. The system also provides a natural logical user interface for both personal and library applications with the shuttle/cartridge combination by requiring that the cartridge be removed before the drive can continue operation.

Figure 7:
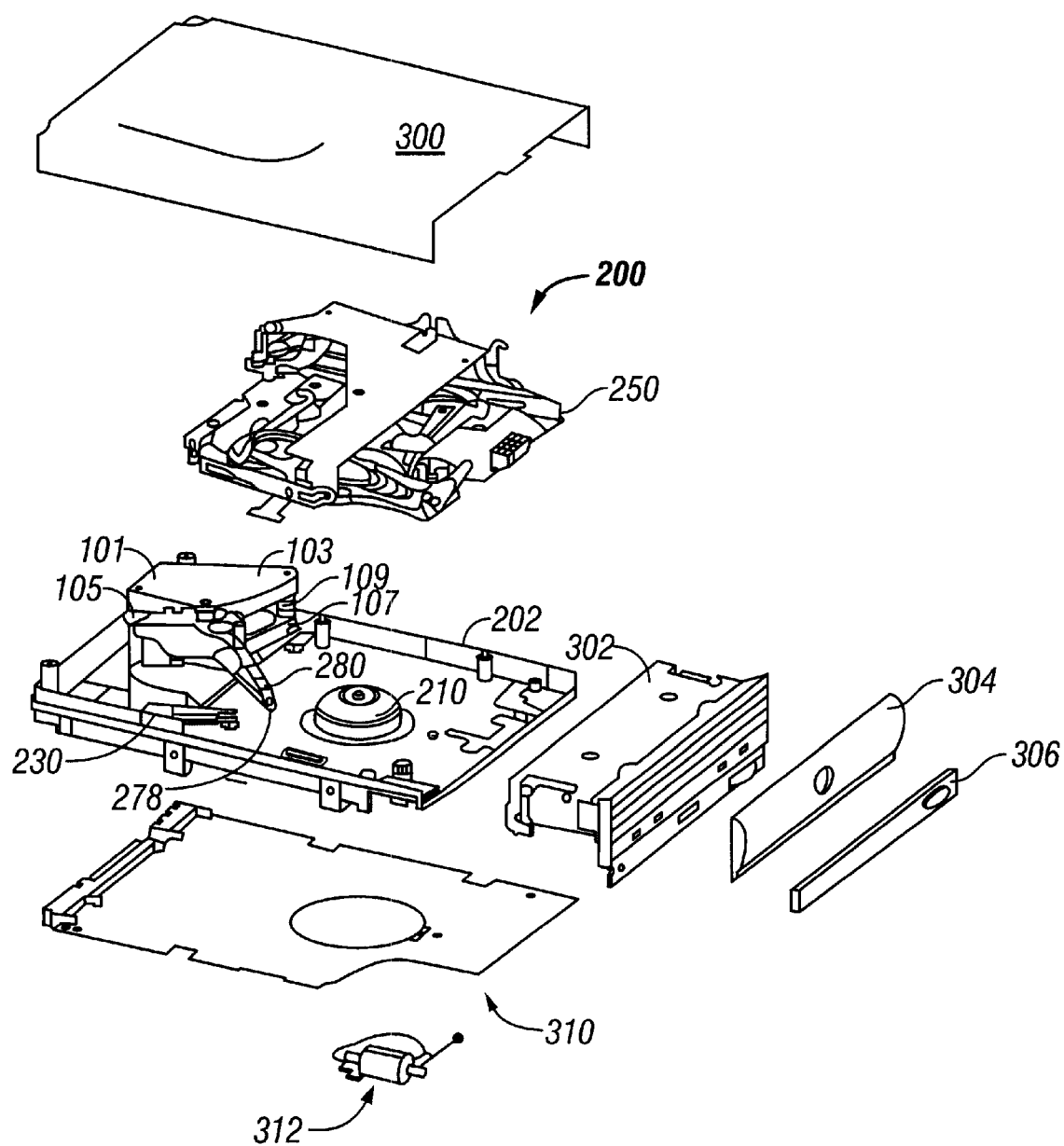
FIG. 7 shows an exploded view of an optical data storage device.

FIG. 7 shows an exploded view of an optical data storage device. A loader assembly 250 is positioned on top of the spindle motor 210 within the base gear 202. The loader assembly 250 accepts a cartridge carrier (not shown), loads the cartridge and opens a cartridge shutter for access by the flying head 280.

In one implementation, the read/write head is a "flying" head, which is suspended over an optical media by an air-bearing surface in a near-field recording configuration where the phasing between an exit facet of the flying head and a recording layer in the media is a fraction of a wavelength The flying head includes a near-field lens with a high index of refraction and usually has a near-field condition. A focus beam with a spot size smaller than that obtainable from a conventional optical system is achieved due to the use of this high index solid immersion lens as the near-field lens. The optical read/write head of this embodiment is described in more detail in copending U.S. patent applicatior Ser. No. 08/846,916, entitled "ELECTRO-OPTICAL STORAGE SYSTEM WITH FLYING HEAD OR NEAR-FIELD RECORDING AND READING," filed on Apr. 295, 1997 and issued as U.S. Pat. No. 6,243,350.

The flying head 280 accesses an optical media on a platter (not shown) which can be writable/erasable materials (i.e., write-many-read-many), write-once-read-many materials, and read-only materials. The writable/erasable materials may be the magneto-optic type, including but not limited to, rare earth-transition metal compounds, or phase-change materials. A multilayer structure with at least one recording layer has a reversed layer construction compared to a conventional multilayer magneto-optic media. A first top dielectric layer, a recording layer, a second dielectric layer, and a reflective substrate may be formed in sequence. The optical media may also have a plurality of recording layers in a multilayer construction.

The cartridge carrier is used to minimize contamination by keeping a platter or disk out of reach of a user at all times. A special box-like carrier is used to "lock" a cartridge therein when the disk is not in use. The carrier includes a door for loading and unloading the cartridge. A special docking system is implemented in the drive. This system keeps a cartridge from being in direct contact with any objects other than the carrier and the drive. In loading a disk, the carrier is temporarily docked to the drive. The loading operation is performed using a load motor 312. The carrier door is then opened and the cartridge is automatically removed from the carrier and transferred into the drive. At this time, the empty carrier can be removed from the drive. In unloading a disk, an empty carrier is temporarily docked to the drive. The docking system automatically transfers the cartridge from the drive to the carrier. The cartridge enclosed in the carrier is then removed from the drive. The carrier door remains closed and locked if the carrier is not docked to the drive.

An actuator assembly 101 is mounted on the base 202. The actuator assembly 101 has top and bottom pole pieces 103 and 107, respectively. The top pole piece 103 has an opening that is adapted to receive a first standoff 109. The top pole piece 103 also has another opening that is adapted to receive a second standoff 105. The standoffs 105 and 107 are positioned in corresponding openings of the bottom pole piece 107. Particularly, the standoff 109 has a recessed region along its height between two hexagon nuts to provide room to slip a protective rubber that protects the read/write head 280 against damage due to a crash of a carriage containing the head.

To complete the assembly 200, a cover 300 is screwed into the base gear 202. Further, a face plate assembly 302 is mounted to the front of the base gear 202 to provide data access information to the user through light-emitting diodes (LEDs) which, along with other electronic components, are mounted on a printed circuit board 310. The face plate assembly 302 in turn engages a door 304 and a door panel 306.

Although the present invention has been described in detail with reference to the embodiments therein, one ordinarily skilled in the art to which this invention pertains will appreciate that various modifications and enhancements may be made without departing from the spirit and scope of the following claims.

What is claimed is:

1. A system for securing a cartridge inserted into a data storage device, comprising:
a cartridge holder having a door frame that has an opening to receive the cartridge when inserted along a direction substantially perpendicular to a plane of the opening;
a slidable member movably engaged to the door frame to slide between a lock position to lock the cartridge and a unlock position to release the cartridge in a direction substantially parallel to the plane of the opening, the member having a recess positioned therein;
a toggle pivotably mounted in the recess, the toggle having a tip to pivot the toggle upon contacting the cartridge; and
an interlock unit coupled to the slidable member and adapted to be separated from the toggle when the toggle in a first position and to engage the toggle when the toggle pivots to a second position.

2. The system of claim 1, further comprising a loader coupled to the interlock unit to drive the slidable member to release the cartridge.

3. The system of claim 2, further comprising a lever connecting the loader to the interlock unit.

4. The system of claim 1, further comprising a projection mounted on the top of the slidable member, the projection adapted to engage a notch in the cartridge to lock the cartridge.

5. The system of claim 4, wherein the loader moves the projection from the notch to release the cartridge.

6. The system of claim 1, further comprising a spring coupled to one end of the slidable member to retract the slidable member when the cartridge is released.

7. The system of claim 1, further comprising a flag coupled to the slidable member to indicate cartridge removal.

8. The system of claim 7, further comprising an opto-coupler coupled to the flag sensor to provide an electrical signal indicating cartridge removal.

9. The system of claim 1, wherein the cartridge has a shuttle.

10. The system of claim 9, wherein the latch releases the cartridge only when shuttle movement is complete.

11. A method for securing a cartridge inserted into a data storage device, comprising:
receiving a cartridge having a tab with an edge portion adapted to move a cartridge latch; and a notch adapted to engage the cartridge latch to lock the cartridge with the data storage device;
sliding a slidable member along a direction substantially perpendicular to the insertion movement of the cartridge; and
pivoting a toggle rotatably mounted in the slidable member in response to the insertion movement of the cartridge to set the toggle to become engaged with an interlock unit coupled to the slidable member to lock the cartridge to the slidable member when the cartridge is fully inserted.

12. The method of claim 11, further comprising a loader coupled to ,he interlock unit to drive the slidable member to release the cartridge.

13. The method of claim 12, further comprising a lever connecting the loader to the interlock unit.

14. The method of claim 11, further comprising engaging a notch in the cartridge to lock the cartridge.

15. The method of claim 14, wherein the loader a moves the projection from the notch to release the cartridge.

16. The method of claim 11, further comprising resiliently biasing the slidable member with a spring coupled to one end of the slidable member.

17. The method of claim 11, further comprising a flag coupled to the slidable member to indicate cartridge removal.

18. The method of claim 17, further comprising an opto-coupler coupled to the flag sensor to provide an electrical signal indicating cartridge removal.

19. The method of claim 11, further comprising accessing a shuttle in the cartridge.

20. The method of claim 19, further comprising releasing the cartridge only when shuttle movement is complete.

21. A cartridge adapted to be inserted into a data storage device, the data storage device having a cartridge latch for securing the cartridge to the data storage device, comprising:
a bottom casing, the bottom casing having a front portion; and
a tab formed on the front portion of the bottom casing, the tab having:
an edge portion adapted to move the cartridge latch when the cartridge is being inserted into the data storage device; and
a notch adapted to engage the cartridge latch to lock the cartridge with the data storage device.

22. The cartridge of claim 21, wherein the tab has two prongs.

23. The cartridge of claim 22, wherein a recess is formed between the two prongs.

24. The cartridge of claim 21, further comprising a second tab formed on the front portion of the bottom casing.

25. The cartridge of claim 21, wherein the tab further comprises a plateau portion positioned between the edge portion and the notch.

* * * * *